United States Patent [19]

Endo

[11] Patent Number: 5,070,490
[45] Date of Patent: Dec. 3, 1991

[54] OPTICAL RECORDING MEDIUM WITH TRACKING TRACKS EXTENDING BEYOND THE RECORDING LAYER AND A METHOD FOR DETECTING TRACKING SIGNAL FROM SAID MEDIUM

[75] Inventor: Kiyonobu Endo, Yokohama, Japan

[73] Assignee: Canon Kabushiki Kaisha, Tokyo, Japan

[21] Appl. No.: 479,205

[22] Filed: Feb. 13, 1990

Related U.S. Application Data

[62] Division of Ser. No. 33,789, Apr. 3, 1987, abandoned.

[30] Foreign Application Priority Data

Apr. 9, 1986 [JP] Japan .................. 61-82928
Apr. 9, 1986 [JP] Japan .................. 61-82929
Aug. 12, 1986 [JP] Japan .................. 61-187854

[51] Int. Cl.⁵ .................. G06K 7/015; G06K 7/10
[52] U.S. Cl. .................. 369/44.26; 369/275.3; 369/279; 235/494; 235/454; 235/487
[58] Field of Search ............... 369/44.26, 275.1, 275.3, 369/277, 278, 279; 235/454, 475, 476, 487, 488, 494

[56] References Cited

U.S. PATENT DOCUMENTS

| 4,425,636 | 1/1984 | Musha ................... 369/44 |
| 4,598,393 | 7/1986 | Pierce et al. ............ 369/46 |
| 4,642,803 | 2/1987 | Drexler .................. 369/111 |
| 4,646,279 | 2/1987 | Yonezawa ............... 369/46 |
| 4,652,730 | 3/1987 | Marshall ................ 369/46 |
| 4,730,293 | 3/1988 | Pierce et al. ............ 235/454 |
| 4,787,075 | 11/1988 | Matsuoka et al. ..... 369/44 |
| 4,853,920 | 8/1989 | Hosoya et al. .......... 235/494 |
| 4,910,725 | 3/1990 | Drexler et al. ......... 235/487 |

FOREIGN PATENT DOCUMENTS

| 0144058 | 6/1985 | European Pat. Off. . |
| 0164061 | 12/1985 | European Pat. Off. . |
| 0164131 | 12/1985 | European Pat. Off. . |
| 0166614 | 1/1986 | European Pat. Off. . |
| 0242118 | 10/1987 | European Pat. Off. ......... 369/275 |
| 58-88838 | 5/1983 | Japan . |
| 59-207039 | 11/1984 | Japan ................... 369/275 |
| 61-151792 | 7/1986 | Japan ................... 235/488 |
| WO82/02969 | 9/1982 | PCT Int'l Appl. . |

Primary Examiner—Stuart S. Levy
Assistant Examiner—Robert Weinhardt
Attorney, Agent, or Firm—Fitzpatrick, Cella, Harper & Scinto

[57] ABSTRACT

In an optical recording medium a substrate is provided having at least a recording surface and a recording layer on an area of the recording surface having a length in a longitudinal direction. A set of linear continuous tracking tracks is formed on the recording surface. The tracking tracks have a length which is greater in the longitudinal direction than the length of the recording layer with a constant distance between adjacent tracks, which distance is equal to or larger than twice the width of each track. Recording areas are arranged and constructed so as to record information irradiated with a light beam. Each of those areas is positioned between neighboring tracking tracks.

6 Claims, 6 Drawing Sheets

OPTICAL RECORDING MEDIUM WITH TRACKING TRACKS EXTENDING BEYOND THE RECORDING LAYER AND A METHOD FOR DETECTING TRACKING SIGNAL FROM SAID MEDIUM

This application is a divisional of application Ser. No. 07/033,789 filed Apr. 3, 1987, now abandoned.

BACKGROUND OF THE INVENTION

1. Field of the Invention

The present invention relates to an optical recording medium allowing information recording by irradiation with a light beam and optical reproduction of thus recorded information, and a method for detecting tracking signals from said medium. The tracking signal detecting method of the present invention is applicable to an apparatus designed solely for information recording, an apparatus designed solely for information reproduction, and an apparatus designed for both information recording and reproduction.

2. Related Background Art

Electronic file systems have been recently developed or commercialized utilizing compact disks or add-on type optical disks, and optical disk systems utilizing erasable magnetooptical or phase transition material. Also, recently attracting attention is an optical card system in which information recording and reproduction are conducted on a card-shaped optical recording medium. Such an optical card is characterized by its portability, because of its shape, and by a large information capacity per area, since a disk-shaped recording medium is unable to record information in its central portion.

The above-mentioned optical recording media record information in the form of an information track or a train of optically detectable recording pits, by scanning the surface of the media with a light beam focused to a small spot and modulated according to the information to be recorded. Thus, in order to correctly record information without trouble, such as crossing of information tracks, it is necessary to control the irradiating position of the light beam in a direction perpendicular to the scanning direction. Such a control function is called auto-tracking. In the following there will be explained a conventional method of detecting a tracking signal for such auto tracking.

FIGS. 1A and 1B are magnified views of the surface of a conventional optical recording medium, wherein reference numeral 13 indicates a tracking track formed in advance on the surface, for example as a stripe-shaped area of different reflectance. Three beam spots 15, 16 and 17 perform a scanning motion in a direction B, in such a manner that the beam spot 16 runs along the center of the tracking track 13, while each of the beam spots 15, 17 half ride the track 13. A tracking signal is obtained from the difference of the detection signals obtained by detecting the light of the spots 15, 17 and is utilized for controlling the beam spots 15, 16, 17, in order to record information in the tracking track 13 with the beam spot 16 as shown in FIG. 1A or reproduce information recorded in the track 13 as shown in FIG. 1B.

In such a conventional method, however, stable auto tracking is often not possible, since record pits 14, indicated by hatched areas, are present in the running trajectory of the beam spots 15, 17 for detecting the tracking signal, so that a signal caused by the record pits 14 may be mixed with the tracking signal. Particularly, in a case of information recording as shown in FIG. 1A, the record pits 14 are always present at the side of the beam spot 15, so that the light from the beam spots 15 and 17 are not balanced and are unable to provide an exact tracking signal.

SUMMARY OF THE INVENTION

The object of the present invention is to resolve the drawbacks in the above-explained conventional technology and to provide an optical recording medium enabling stable auto tracking and a method for detecting a tracking signal by means of said medium.

The above-mentioned object can be achieved, according to the present invention, by an optical recording medium comprising:

a substrate provided with at least a recording surface;

continuous linear tracking tracks arranged on said recording surface with a constant spacing which is equal to or larger than twice of the width of said tracking tracks; and recording areas, each formed between said tracking tracks and capable of information recording by irradiation with a light beam.

According to the present invention, the detection of a tracking signal in information recording on or reproduction from such an optical recording medium is achieved by the following steps of:

projecting at least a main light beam in the area between tracking tracks and projecting at least two auxiliary beams in such a manner that the spots of said beams partially ride, respectively, on different tracking tracks;

causing said main and auxiliary beams to perform a scanning motion along said tracks and recording information in said area or reproducing information from said area by means of the main beam; and detecting light from the spots of said auxiliary beams modulated by said tracking tracks and comparing thus obtained detection signals to obtain a tracking signal for attaining exact scanning of said area with said main beam.

DETAILED DESCRIPTION OF THE PREFERRED EMBODIMENTS

The present invention will not be explained in detail by embodiments thereof, shown in the attached drawings, in which an optical card is employed as the optical recording medium.

Figure 2:
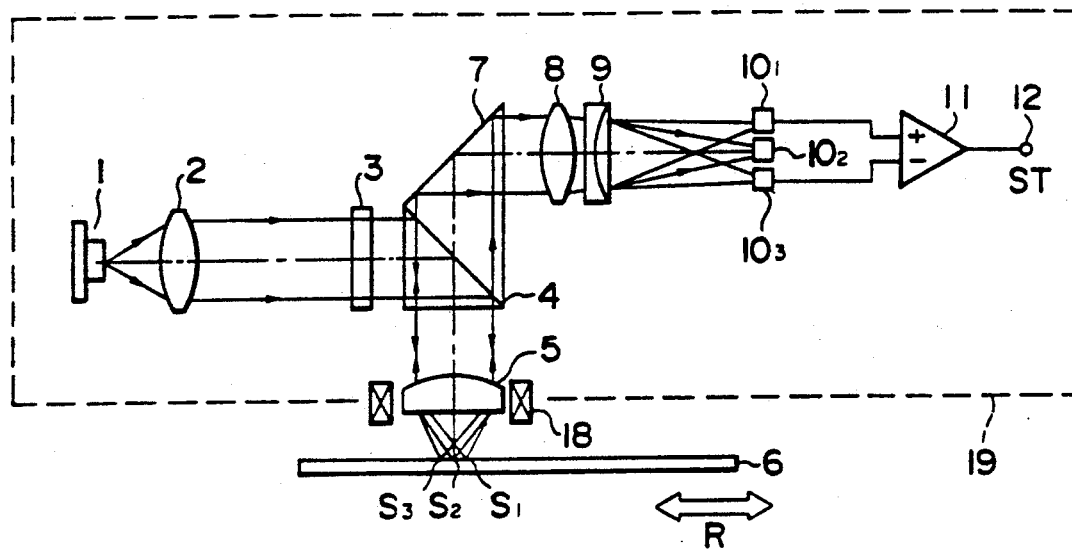
FIG. 2 is a schematic view of an optical information record/reproduction apparatus embodying the tracking signal detecting method of the present invention.

FIG. 2 is a schematic view of an optical information record/reproduction apparatus embodying the tracking signal detecting method of the present invention. A light beam emitted from a light source 1 such as a semiconductor laser is rendered parallel by a collimating lens 2, and is split into three beams by a diffraction grating 3. The divided light beams are reflected by a beam splitter 4 and are focused by an objective lens 5 onto an optical card 6 to form three beam spots S1, S2, S3. The light beams reflected by the optical card 6 again pass through the objective lens 5 and are separated from the incident beams by the beam splitter 4. The reflected beams are then reflected by a mirror 7, condensed by a sensor lens 8 and a cylindrical lens 9 and enter photosensors 10-1, 10-2, 10-3 which are so positioned as to respectively receive the light from the beam spots S1, S2, S3.

Figure 3:
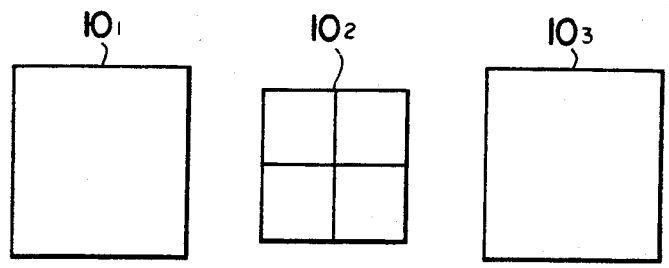
FIG. 3 is a plan view of the light-receiving face of a photosensor shown in FIG. 2.

As shown in FIG. 3, the light-receiving face of the photosensor 10-2 is divided into four areas, and the difference between the sums of the detection signals of two sets of diagonally positioned light-receiving areas can be utilized for determining the astigmatic aberration introduced by the cylindrical lens 9. Thus, a focusing signal is obtained by the already known astigmatism method. Also, in the reproduction of information, a reproduction signal is obtained from the photosensor 10-2. Also, in the difference of the signals from photosensors 10-1 and 10-3 is obtained by a differential amplifier 11 and is released as a tracking signal $S_T$ from a terminal 12. The tracking signal $S_T$ is fed, by an unrepresented circuit, back to a lens actuator 18 to displace the objective lens 5 in a direction perpendicular to the optical axis thereof, thus achieving auto tracking.

The optical card 6 reciprocates in a direction R by an unrepresented driving mechanism, whereby the spots S1, S2, S3 scan the optical card 6. An optical head 19, containing the aforementioned optical system is rendered movable, for access to tracks, in a direction perpendicular to the direction R, or a direction perpendicular to the plane of FIG. 2.

Figure 4:
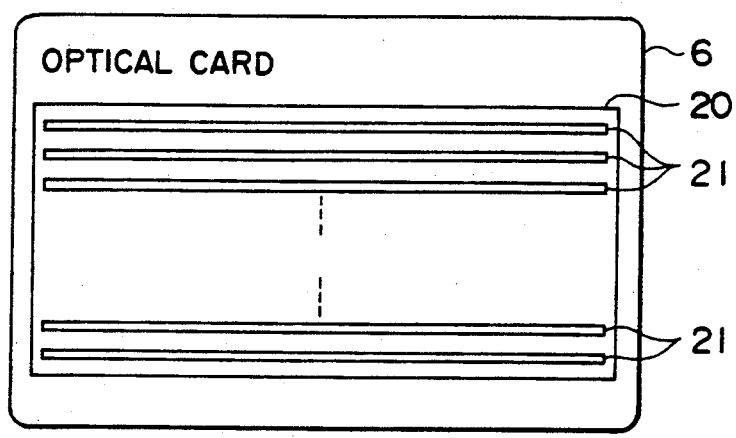
FIG. 4 is a plan view of an optical card embodying the present invention.

FIG. 4 is a plan view of the above-mentioned optical card, consisting of a substrate, for example, of a plastic material, and a recording layer 20 formed thereon and composed of a silver halide material, a dye or a chalcogenide material. The recording layer 20 is provided with mutually parallel plural tracking tracks 21 which are optically detectable, for example, by being in the form of a relief or by a difference in reflectance. These tracking tracks 21 are formed at a constant pitch, and recording areas for information recording are formed between the tracking tracks 21.

Figure 5:
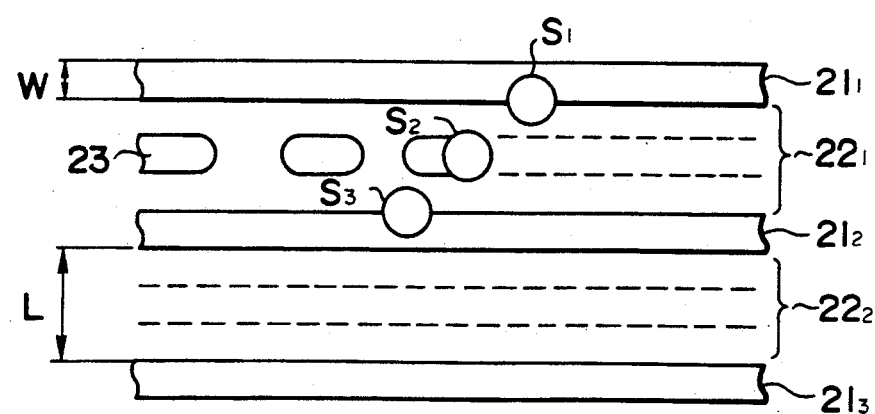
FIGS. 5, 6 and 7 are magnified views of the recording surface of an optical card showing the tracking signal detecting method of the present invention.

FIG. 5 is a magnified plan view of the recording surface of the optical card 6, for explaining the recording process utilizing the apparatus shown in FIG. 2. Recording areas 22-1, 22-2 are formed between the tracking tracks 21-1, 21-2, 21-3. The beam spots S1, S3 are so projected that they respectively partly ride the tracking tracks 21-1, 21-2, and the beam spot S2 is projected on the recording area 22-1. If the beam spots S1-S3 are displaced perpendicularly to the tracks, the intensity of the beam reflected from the spot S1 becomes different from that of the beam reflected from the spot S3. Consequently, as shown in FIG. 2, the difference of the signals obtained by detecting the reflected beams provides a stacking signal $S_T$ indicating the quantity and direction of the displacement. Auto tracking based on the tracking signal exactly guides the beam spot S2 always on the recording area between two tracking tracks, and allows information recording as shown by record pits 23. Also, in the case of recording information on the recording area 22-2, the beam spots S1, S2, S3 are so projected that they are respectively present on the tracking track 21-2, recording area 22-2 and tracking track 21-3. The beam spot S1 or S3 usually has a Gaussian intensity distribution on the optical card, stronger at the center of the spot. Thus, if each of such spots is so positioned as to half ride the tracking track, a large change in the light intensity is obtained even by a small displacement, thus ensuring a highly sensitive tracking signal detection.

Referring to FIG. 5, the width W of each of the tracking tracks 21-1 to +21-3 preferably satisfies a relation:

$$W \leq D1 (=D3) \tag{1}$$

wherein D1, D2, D3 are the diameters of the beam spots S1, S2, S3, or the widths of the beams perpendicular to the tracks if the spots are not circular, because, if the diameter of the beam spot is smaller than the width of the tracking track, no change will result by a displacement of the beam spot in a direction perpendicular to the track when the spot is completely contained in the track. Also the width L of the recording area 22-1 or 22-2 between two tracking tracks preferably satisfies a relation:

$$L \geq D2 + (\tfrac{1}{2}) \cdot d1 + (\tfrac{1}{2}) \cdot D3 (=D2+Db1) \tag{2}$$

in order to prevent a situation where the record pits 23 recorded by the beam spot S2 are detected by the beam spot S3, thereby providing a stable tracking signal. D1, D2 or D3 indicates the diameter of a portion where the light intensity is $1/e^2$ of the peak intensity.

Thus, based on the relations (1) and (2), the optical recording medium adaptable in the method of the present invention satisfies a relation:

$$L \geq 2W \tag{3}$$

i.e. the width L of the recording area between the tracking tracks is equal to or larger than twice the width W of the tracking track. However, the width L is preferably in a range of L=2W to 3W, since an excessively large value of width L requires complicated adjustment of the gaps between the beam spots and reduces the recording density.

Figure 6:
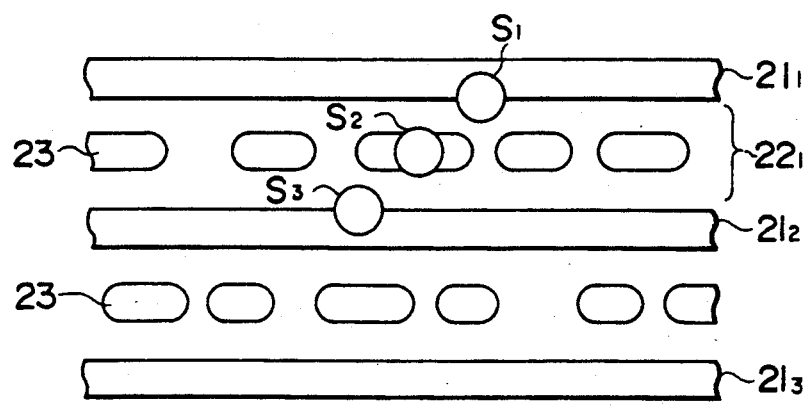
Figure 7:
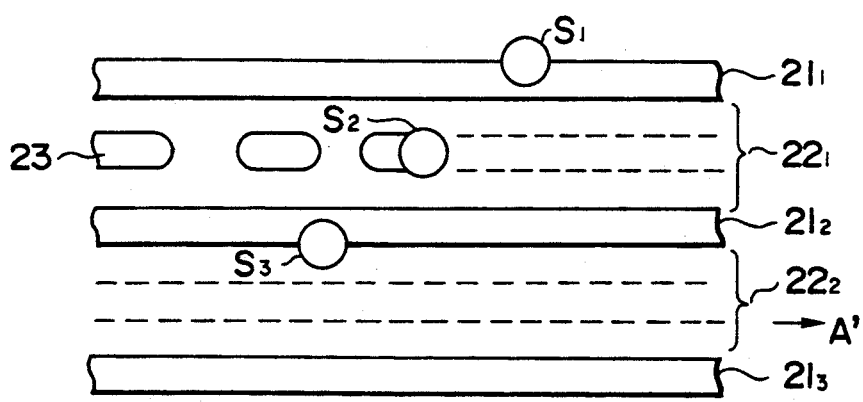

FIG. 5 only shows the case of information recording, but the detection of a tracking signal can be conducted in the identical manner when reproducing information already recorded in the recording area. FIG. 6 shows a case of reading record pits 23 with the beam spot S2. For this purpose, the beam spots S1, S3 are so projected that they respectively partly ride the tracking tracks 21-1 and 21-2, and the tracking signal is obtained by comparing the intensity of the light beams reflected from these spots. In FIG. 5, the beam spots are positioned on the edges of the tracking tracks closer to the area for information recording or reproduction, but they may instead be positioned on the edges farther from this area, as shown in FIG. 7, in order to detect the tracking signal. In FIG. 7, like components as those in FIG. 5 are represented by like numbers and will not be explained further.

The tracking signal detecting method of the present invention has an advantage that it is insensitive to the inclination of the surface of the optical recording medium, as will be explained in the following.

Figure 8A:
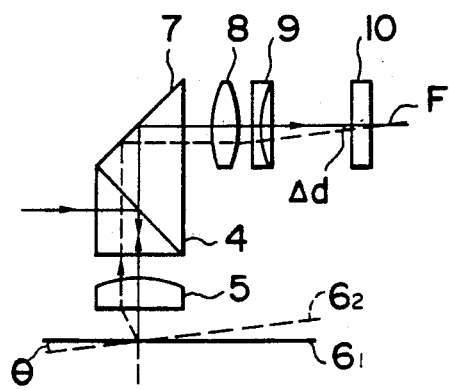
FIGS. 8A, 8B and 8C are schematic views showing the influence of the inclination of the surface of the medium to the tracking signal.

FIG. 8A shows a part of the optical system shown in FIG. 2, wherein like components as those in FIG. 2 are represented by like numbers. If the surface 6-1 of the optical recording medium is perpendicular to the optical axis, the principal ray of the light beam proceeds along the optical axis and reaches the sensor 10 as represented by solid lines. However, if the surface is inclined by an angle $\theta$ as represented by reference numeral 6-2, the principal ray of the reflected beam is displaced from the optical axis when reaching the sensor 10. Thus, if the light-receiving face of the sensor 10 is not in a conjugate position F to the surface of the optical recording medium with respect to the lens system consisting of the objective lens 5, sensor lens 8 and cylindrical lens 9, the light beam is displaced by $\Delta d$ on the surface of the sensor.

Figure 8B:
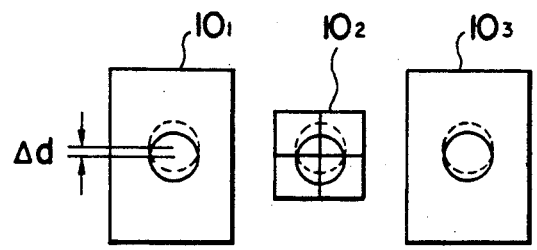
Figure 8C:
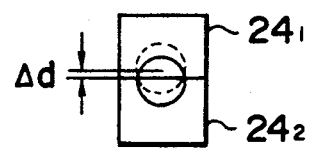

Thus, in the so-called push-pull method in which a photosensor with split light-receiving faces 24-1, 24-2 as shown in FIG. 8C is positioned on the pupil plane of the lenses and the tracking signal is detected from the difference of the detection signals of the split light receiving faces, the above-mentioned displacement $\Delta d$ of the light beam is directly detected as an asymmetric distribution of the light beam, thereby generating an offset in the tracking signal and rendering exact auto tracking impossible.

On the other hand, in the method of the present invention, the photosensors can be positioned conjugate with the surface of the optical recording medium. Also, even if they are not in the conjugate position, the photosensors 10-1 and 10-3 may be formed large enough, as shown in FIG. 8B, so as to absorb the influence of the displacement $\Delta d$. Therefore the aforementioned offset no longer appears, and exact tracking signal can be detected, even when the surface of the recording medium is inclined.

The method of the present invention, being little influenced by the inclination of the surface of the recording medium, is particularly suitable for optical cards which will often be subjected to bending when carried.

Figure 9A:
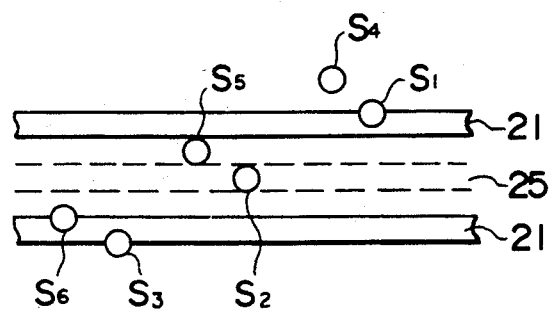
FIGS. 9A, 9B and 9C are schematic views showing another embodiment of the tracking signal detecting method of the present invention.

FIG. 9 shows another embodiment of the present invention.

Figure 1A:
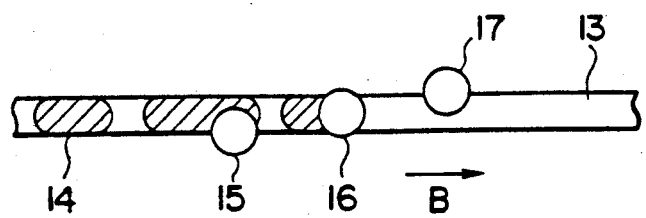
FIGS. 1A and 1B are schematic views showing a method of detecting a tracking signal in a conventional optical recording medium.
Figure 1B:
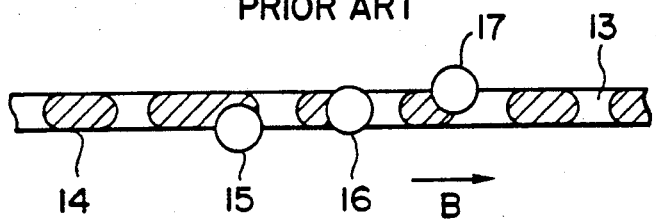
Figure 9B:
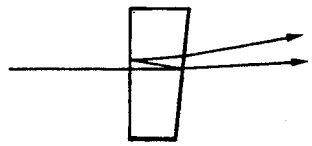
Figure 9C:
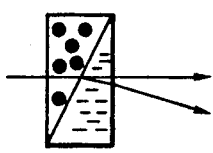

In the foregoing embodiment, the auto focusing signal is detected by the astigmatic property of the beam spot S2. However, also in the beam spot S2, the presence of record pits may affect the auto focusing signal, as shown in FIG. 1. In such a case, a beam angle separating element utilizing a rear reflection of a wedge prism or a double refraction of a crystal, such as Wolaston prism, as respectively shown in FIGS. 9B and 9C, is placed between the diffraction grating 3 and the beam splitter 4 shown in FIG. 2, to form additional beam spots S4–S6, simultaneously with the beam spots S1–S3. The beam spot S5 is positioned in a non-recorded area between the tracking track 21 and the signal track 25 on which the record pits are formed, and is utilized for detecting the focusing signal. In this manner there is achieved stable auto focusing without the influence of the record pits. In this embodiment, as will be apparent from FIG. 9A, the width L of the recording area between the tracking tracks is approximately three times that of the track width W, or L=3W.

Figure 10:
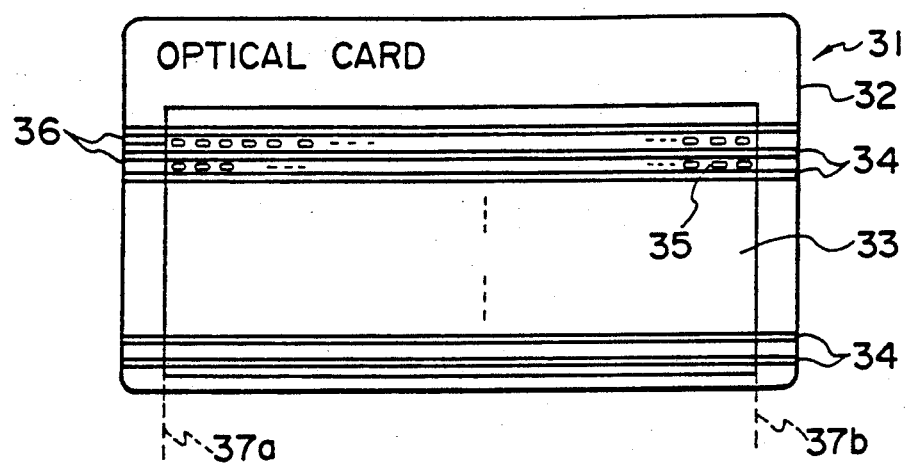
FIG. 10 is a schematic view showing another embodiment of the optical card of the present invention.

FIG. 10 is a schematic plan view of another embodiment of the optical recording medium of the present invention, wherein an optical card 31 is composed of a flexible rectangular substrate 32, such as a plastic sheet, and a recording layer 33 formed thereon and composed, for example of a silver halide material, a dye or a chalcogenide material. The recording layer 33 is limited to areas 37a and 37b, so that information recording is not possible on both ends in the longitudinal direction of the optical card 31.

Over the entire longitudinal dimension of the optical card 31, there are provided a plurality of stripe-shaped linear tracking tracks 34 in parallel manner. Such tracking tracks can be made, for example, by forming plural grooves on the substrate.

Consequently, in the end portions, outside areas 37a and 37b, in the longitudinal direction of the optical card 31, the substrate 32 is provided only with a plurality of tracking tracks 34. In the area between areas 37a and 37b, there are provided a plurality of tracking tracks 34 and a plurality of recording areas 36 for forming record pits, each positioned between two neighboring tracking tracks. The relation between the width W of the tracking tracks and the gap L between the tracks is the same as in the optical card shown in FIG. 4.

Also, in the optical card 31 of the present embodiment, information recording and reproduction are conducted in the same manner as already explained in relation to FIGS. 5 and 6.

In the following, there will be explained additional features of the present embodiment of the above-explained structure.

Figure 11A:
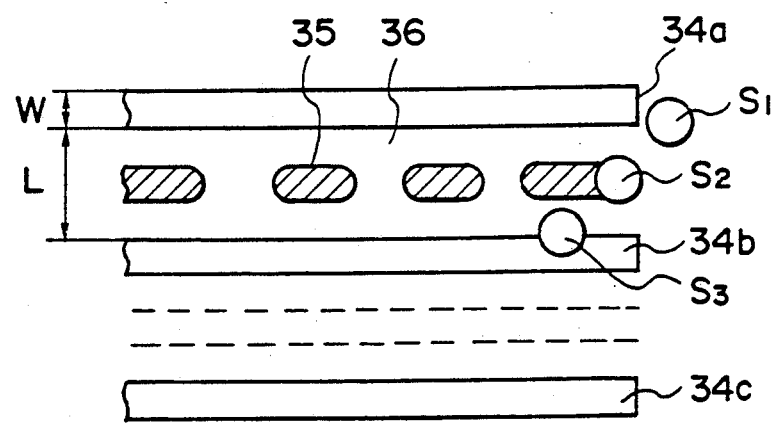
FIGS. 11A and 11B are magnified plan views of the recording surface of an optical card showing the mode of tracking signal detection at an end portion of the recording area.

In a case, as shown in FIG. 11A, the record pits 35 are formed to the end of the tracking tracks 34a, 34b, 34c in the longitudinal direction of the optical card 31, a first side spot S1 no longer has a tracking track to follow when the main spot S2 reaches the end record pit. Consequently, the intensities of the reflected beams from the side spot S1 and S3 become unbalanced, and stable auto tracking cannot be expected.

Figure 11B:
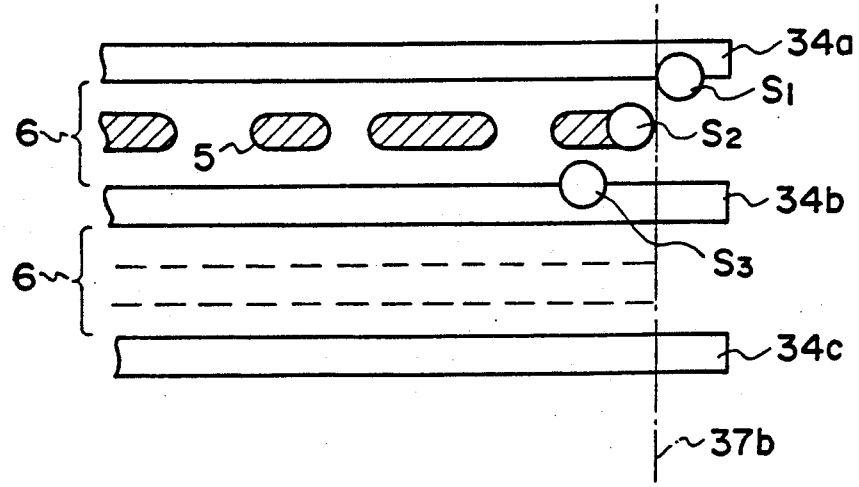

In the present embodiment, as shown in FIG. 11B, there is provided an area without record pits, of a length at least that of the diameter of the side spot S1 or S3 (no longer a diameter if the spots are not circular) inwardly from the end of the tracking tracks 34a, 34b, 34c (to the right from outside area 37b shown in FIG. 11B), so that the first side spot S1 still has a tracking track to follow when the main spot S2 is positioned at the record pit at the right end. Consequently, the intensities of the reflected beams from the first and second side spots S1, S3 are mutually balanced to achieve stable auto tracking.

In the foregoing explanation of the recording area, the area is limited by the area of the recording layer, but the recording area may be selected narrower than the recording layer. In such a case, the recording area can be defined by an optically detectable mark provided in the recording layer.

The present invention is not limited to the foregoing embodiments, but is subject to various modifications. For example, the optical recording medium can be an optical disk, instead of an optical card. In the case of an optical disk, the tracking tracks are formed concentrically or spirally. In the case of spiral tracking tracks, the neighboring tracks are, in fact, a single continued track, but such structure is also included in the present invention.

What is claimed is:

1. An optical recording medium comprising:
   a card-like substrate comprising at least a recording surface;
   a recording layer provided solely on an area of said recording surface and having a length in a longitudinal direction; and
   a plurality of tracking tracks formed on said recording surface and extending parallel to one another, each of said tracking tracks having a length which is greater in the longitudinal direction than the length of said recording layer 2. An optical recording medium according to claim 1, wherein said substrate has a rectangular shape, said recording layer is formed on a portion of said substrate other than its both end portions with respect to the longitudinal direction, and each of said tracking tracks is provided extending all over said substrate with respect to the longitudinal direction.

3. An optical recording medium according to claim 1, wherein said substrate comprises a plastic sheet.

4. An optical recording medium according to claim 1, wherein said recording layer is composed of a material selected from a group consisting of silver halide, dye and chalcogenide.

5. A method for information recording on or reproduction from a card-like optical recording medium comprising a plurality of tracking tracks extending parallel to one another, and each of the plurality of tracking tracks having a length, and a plurality of recording areas formed between two neighboring tracking tracks of the plurality of tracking tracks, each of the plurality of recording areas having a length, said method comprising the steps of:
   scanning each of the plurality of recording areas with a main beam and each of the two neighboring tracks with two auxiliary beams;
   obtaining a tracking signal from the auxiliary beam; and
   recording or reproducing the information with the main beam in accordance with said obtaining of the tracking signal,
   wherein at least one of the auxiliary beams precedes the main beam and the length of each of the tracking tracks in a longitudinal direction is longer than the length of the recording area in the longitudinal direction.

6. A method according to claim 5, wherein the two auxiliary beams respectively preceding and succeeding the main beam, respectively scan the tracking tracks both adjacent to the recording area scanned by the main beam.

* * * * *

UNITED STATES PATENT AND TRADEMARK OFFICE
CERTIFICATE OF CORRECTION

PATENT NO. : 5,070,490

DATED : December 3, 1991

INVENTOR(S) : Kiyonobu Endo

It is certified that error appears in the above-identified patent and that said Letters Patent is hereby corrected as shown below:

COLUMN 1

Line 46, "following" should read --following,--; and

Line 52, "example" should read --example,--.

COLUMN 2

Line 21, "of" should be deleted.

COLUMN 3

Line 6, "not" should read --now--.

COLUMN 4

Line 6, "stacking" should read --tracking--;
Line 23, "+21-3" should read --21-3--;
Line 35, "Also" should read --Also,--; and
Line 39, "$L \geq D2+(\frac{1}{2}) \cdot d1+(\frac{1}{2}) \cdot D3 (=D2+Db1)$" should read --$L \geq D2+(\frac{1}{2}) \cdot D1+(\frac{1}{2}) \cdot D3 (=D2+D1)$--.

UNITED STATES PATENT AND TRADEMARK OFFICE
CERTIFICATE OF CORRECTION

PATENT NO. : 5,070,490

DATED : December 3, 1991

INVENTOR(S) : Kiyonobu Endo

It is certified that error appears in the above-identified patent and that said Letters Patent is hereby corrected as shown below:

COLUMN 6

Line 1, "manner" should read --manner,--; and
Line 12, "example" should read --example,--.

COLUMN 7

Line 16, "layer" should read --layer.--.

Signed and Sealed this

Tenth Day of August, 1993

Attest:

MICHAEL K. KIRK

Attesting Officer     Acting Commissioner of Patents and Trademarks